United States Patent
Tanaka et al.

(10) Patent No.: US 6,713,429 B1
(45) Date of Patent: *Mar. 30, 2004

(54) PURIFICATION CATALYST FOR INTERNAL COMBUSTION ENGINE EXHAUST GAS

(75) Inventors: Masakazu Tanaka, Okazaki (JP); Yosiyasu Andou, Nagoya (JP); Keiji Ito, Nagoya (JP); Takahiro Kida, Nukata-gun (JP)

(73) Assignee: Denso Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,415

(22) Filed: Dec. 16, 1999

(30) Foreign Application Priority Data

Dec. 21, 1998 (JP) .............................. 10-362736

(51) Int. Cl.[7] .................................................. B01J 21/04
(52) U.S. Cl. ............................... 502/527.19; 502/439
(58) Field of Search .............................. 502/100, 300, 502/439, 527.11, 527.19

(56) References Cited

U.S. PATENT DOCUMENTS

| | | | | |
|---|---|---|---|---|
| 3,502,596 A | * | 3/1970 | Sowards | 252/477 |
| 3,853,485 A | * | 12/1974 | Hogan | 23/288 F |
| 4,253,992 A | * | 3/1981 | Soejima et al. | 252/477 R |
| 4,335,023 A | | 6/1982 | Dettling et al. | 252/466 PT |
| 6,159,578 A | * | 12/2000 | Ichikawa | 428/118 |
| 6,159,893 A | * | 12/2000 | Kondo | 502/251 |
| 6,444,610 B1 | * | 9/2002 | Yamamoto | 502/325 |

FOREIGN PATENT DOCUMENTS

| | | |
|---|---|---|
| DE | 199 13 626 A1 | 9/1999 |
| JP | 53-149886 | 12/1978 |
| JP | 62-74453 A | 4/1987 |
| JP | 62-225250 A | 10/1987 |

* cited by examiner

*Primary Examiner*—Wayne A. Langel
(74) *Attorney, Agent, or Firm*—Nixon & Vanderhye PC

(57) ABSTRACT

A purification catalyst for exhaust gas is provided that uses a hexagonal cell monolithic carrier which is able to demonstrate purification performance that is superior to the case of using a square cell monolithic carrier. This purification catalyst for exhaust gas comprises a monolithic carrier (10) provided with hexagonal cells (15) of 200 cells/in$^2$ or more in which the porosity of partition walls (11) that form the cells (15) is 25% or more; and, a catalyst layer (2) arranged on the surface of the partition walls (11) of the monolithic carrier (10) that contains a catalyst component for purification of exhaust gas. The thickness of catalyst layer (2) is 10–70 μm at its thin portion (21), and its thick portion (22) has a thickness of no more than 12 times that of thin portion (21).

10 Claims, 3 Drawing Sheets

THICKNESS OF THIN PORTION OF CATALYST LAYER (μm)

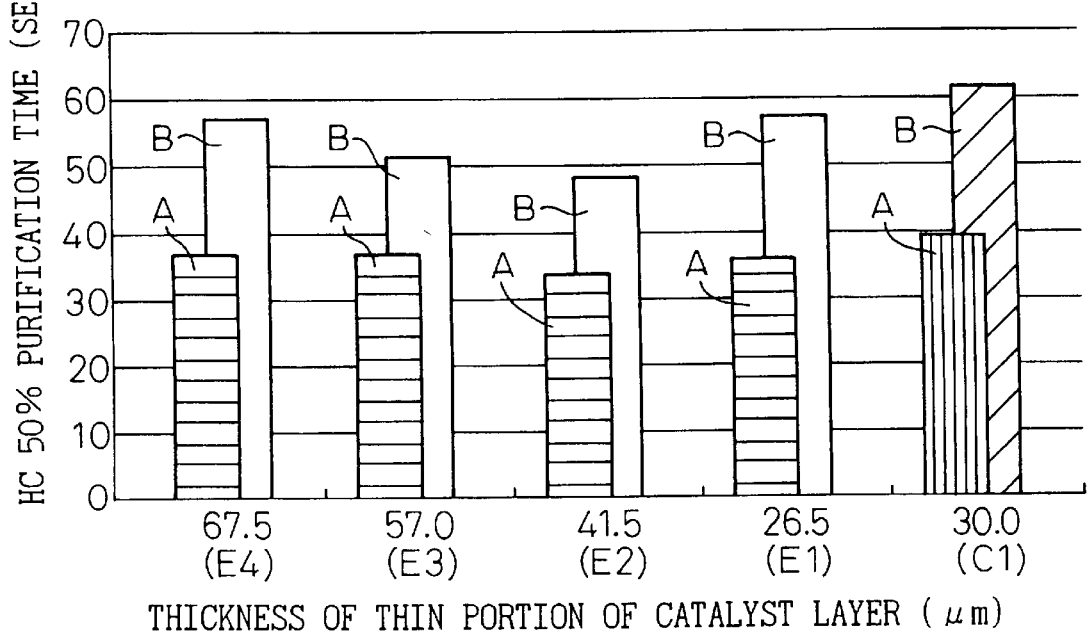
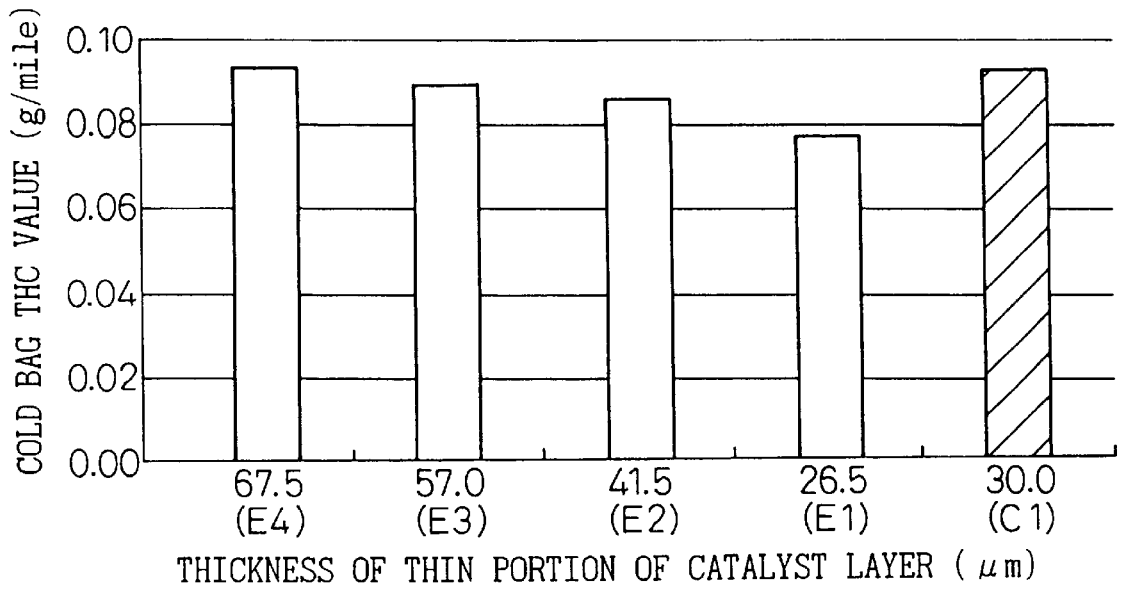

PURIFICATION CATALYST FOR INTERNAL COMBUSTION ENGINE EXHAUST GAS

BACKGROUND OF THE INVENTION

1. Field of the Invention

The present invention relates to a purification catalyst for the exhaust gas from an internal combustion engine of an automobile and so forth.

2. Description of the Related Art

Catalytic converter systems are used as systems for purifying the exhaust gas emitted from automobile engines and other internal combustion engines. These catalytic converter systems are provided with a carrier, on which is loaded a precious metal such as platinum or rhodium in the form of a catalyst, in the exhaust pipe, that purifies HC, CO, NOx and so forth present in exhaust gas by an oxidation reaction or oxidation-reduction reaction.

This catalytic converter system uses a so-called monolithic carrier, typically comprising a honeycomb-shaped ceramic carrier having a large number of cells (holes), as the base material, and a catalytic layer containing catalyst components is loaded on the inside of the cells of the monolithic carrier.

In addition, in monolithic carriers of the prior art, it was typical to employ a square shape for the shape of the cells. In monolithic carriers having this type of square-shaped cells (square cells), various technologies have been proposed for improving the purification efficiency of exhaust gas.

For example, in the catalysts loading process, since it is common to use an aqueous slurry that contains the catalyst components, it is preferable to increase the moisture absorption of the partition walls. Consequently, the use of a monolithic carrier having increased partition wall porosity and increased moisture absorption is currently being examined.

In addition, much research has also been conducted on the thickness of the catalyst layer and catalyst performance. For example, Japanese Examined Patent Publication (Kokoku) No. 53-149886 proposes that the use of a mean catalyst layer thickness of 50–300 $\mu$m yields a catalyst having long life and which is active at low temperatures.

In addition, Japanese Unexamined Patent Publication (Kokai) No. 62-74453 proposes that, when forming two wash coat layers, making the total film thickness 30–70 $\mu$m improves purification performance and demonstrates rapid activity at high SV (space velocity) values.

However, all of the above-mentioned prior art involves the case of loading catalysts on a monolithic carrier having square cells.

On the other hand, triangular cells, hexagonal cells and other cell shapes have been proposed instead of square cells. Since hexagon-shaped cells (hexagonal cells) in particular more closely approach a circle than rectangular cells in geometrical terms, loading of the catalyst layer can be made to be more uniform than in the case of square cells.

Consequently, the use of monolithic carriers having the above-mentioned hexagonal cells has attracted attention in use as a purification catalyst able to accommodate increasingly strict emissions regulations in recent years.

However, in the case of using a monolithic carrier having the above-mentioned hexagonal cells, there have yet to be proposals made regarding the optimum loaded state of the catalyst layer.

In consideration of the above-mentioned problems of the prior art, the object of the present invention is to provide a purification catalyst for exhaust gas using a hexagonal cell monolithic carrier that is able to demonstrate purification performance that is superior to the case of using a square cell monolithic carrier.

SUMMARY OF THE INVENTION

The present invention is a purification catalyst for exhaust gas of internal combustion engines comprising: a monolithic carrier provided with hexagonal cells of 200 cells/in$^2$ or more in which the porosity of the partition walls that form said cells is 25% or more; and, a catalyst layer arranged on the surface of said partition walls of said monolithic carrier that contains catalyst components for purification of exhaust gas; wherein, the thickness of said catalyst layer is 10–70 $\mu$m at its thin portion, and its thick portion has a thickness of no more than 12 times that of said thin portion.

BRIEF DESCRIPTION OF THE INVENTION

FIG. 5 is a graph showing the relationship between the thickness of the thin portion of the catalyst layer and HC 50% purification time in a second embodiment of the present invention.

FIG. 6 is a graph showing the relationship between the thickness of the thin portion of the catalyst layer and cold mode THC value in a third embodiment of the present invention.

DESCRIPTION OF THE PREFERRED EMBODIMENTS

Figure 1:
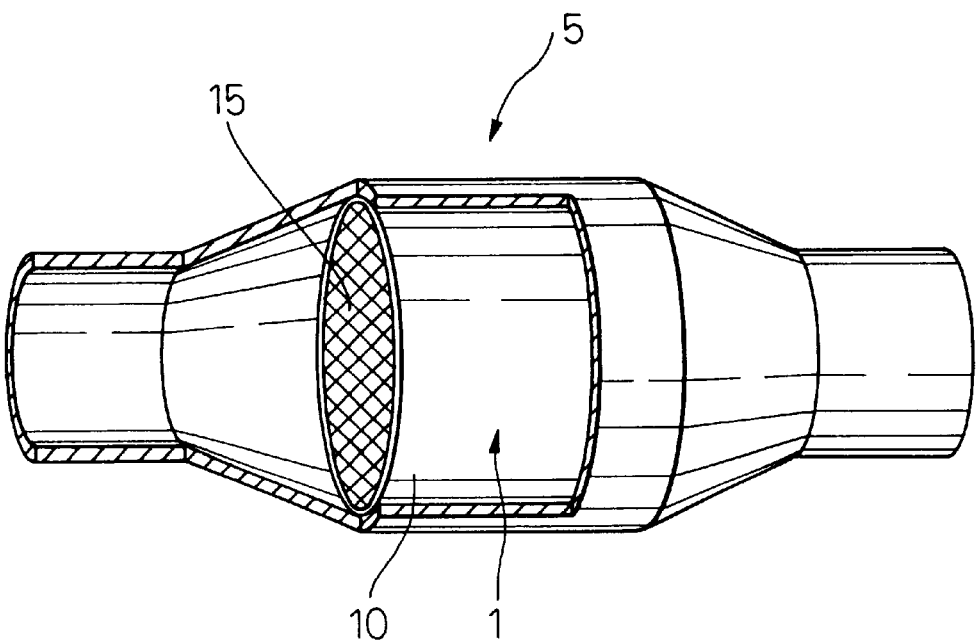
FIG. 1 is an explanatory drawing showing the structure of a catalytic converter in a first embodiment of the present invention.

What should be noticed in the present invention is that a hexagonal honeycomb-shaped monolithic carrier having the above-mentioned specific cells/in$^2$ and porosity is used, and that a catalyst layer having the above-mentioned specific thickness is loaded onto that carrier.

As previously described, a carrier having hexagon-shaped cells (hexagonal cells) at 200 cells/in$^2$ or more is used for the above-mentioned monolithic carrier. In the case the above-mentioned hexagonal cells are of less than 200 cells/in$^2$, the problem of not improving purification performance occurs due to the small catalyst loading surface area. Consequently, 400 cells/in$^2$ or more is mote preferable.

In addition, in order to attain the above-mentioned high density of cells/in$^2$, it is preferable to reduce the thickness of the above-mentioned partition walls. The thickness of the partition walls in this case is, for example, 6 mil (approx. 150–170 $\mu$m), and the thickness of the partition walls can be reduced even further to 1.5–4 mil.

In addition, in the above-mentioned monolithic carrier, the porosity of the partition walls that form the hexagonal cells is 25% or more. In the case porosity is less than 25%, moisture absorption of the partition walls decreases, resulting in the problem of increased costs in the catalyst loading process.

Namely, in the case of loading the catalyst, a method is typically employed in which a slurry containing the catalyst components is loaded onto the cell partition walls followed by drying to obtain the above-mentioned catalyst layer. In this case, if the porosity is less than 25%, sufficient moisture absorption of the partition walls cannot be obtained, the amount of the above-mentioned slurry coated per application decreases, and several coating steps are required. On the other hand, the upper limit of porosity is preferably 60% to maintain the strength of the partition walls.

Next, the above-mentioned catalyst layer is loaded so that its thin portion has a thickness within the range of 10–70 μm. Here, the thin portion of the catalyst layer refers to a portion where the thickness is the thinnest, namely the thickness of the catalyst layer that is loaded at the center of each side that is farthest away from the apexes of the hexagon in the hexagonal cells.

In the case the thickness of this thin portion is less than 10 μm, there is the problem of a short lifetime of the purification catalyst for exhaust gas. On the other hand, in the case the thickness of the thin portion exceeds 70 μm, in addition to more of the catalyst component than necessary being loaded, the space through which the exhaust gas passes becomes smaller resulting in the problem of increased pressure loss.

In addition, the above-mentioned catalyst layer is loaded so that the thickness of the thick portion is no more than 12 times the thickness of the above-mentioned thin portion. Here, the thick portion of the above-mentioned catalyst layer refers to the portion where the thickness is the thickest, namely the thickness of the catalyst layer that is loaded on the hexagon apexes portions in the hexagonal cells.

The thickness of this thick portion becomes greater as the thickness of the above-mentioned thin portion becomes greater. On the other hand, the ratio of the thick portion to the thin portion tends to become greater as the thickness of the thin portion becomes smaller. In the case the thickness of the thick portion exceeds 12 times the thickness of the above-mentioned thin portion, there is the problem of it being difficult to maintain the thickness of the above-mentioned thin portion at 10 μm or more.

Examples of the catalyst component of the above-mentioned catalyst layer include previous metals such as platinum and rhodium. In addition, the above-mentioned catalyst layer can be composed of a mixture of, for example, those catalyst components and alumina powder.

Examples of materials that can be used for the above-mentioned monolithic material include cordierite and other ceramics.

As was previously described, the purification catalyst for exhaust gas from internal combustion engines of the present invention uses a monolithic carrier having hexagonal cells of 200 cells/in$^2$ or more and porosity of its partition walls of 25% or more, and has a catalyst layer loaded on said monolithic carrier wherein the thin portions of its partition walls have a thickness of 10–70 μm, while the thickness of its thick portions is no more than 12 times the thickness of its thin portions.

Consequently, as is described in detail in the embodiments to be mentioned later, the purification catalyst for exhaust gas of the present invention is able to improve a purification performance while reducing pressure loss more than in the case of using a square cell monolithic carrier which is the mainstream of the prior art. Moreover, performance following initial deterioration of the catalyst after starting to use the purification catalyst can be maintained at a higher level than the case of catalysts using square cell monolithic carriers of the prior art.

Thus, according to the present invention, a purification catalyst for exhaust gas can be provided that uses a hexagonal cell monolithic carrier which is able to demonstrate purification performance that is superior to the case of using a square cell monolithic carrier.

It is preferable that the porosity of the above-mentioned partition walls be 30% or more. As a result, the moisture absorption of the partition walls can be further improved, thereby facilitating greater ease of catalyst loading work and reduced costs.

It is preferable that the thickness of the above-mentioned catalyst layer be such that the above-mentioned thin portion is 20–50 μm, and the above-mentioned thick portion has a thickness that is larger than and no more than 6 times, preferably 2–6 times that of the above-mentioned thin portion. Namely, as a result of the thickness of the thin portion of the above-mentioned catalyst layer being 20–50 μm, in addition to it being possible to more reliably maintain the life of the purification catalyst for exhaust gas, it is also possible to suppress pressure loss.

In addition, by making the thickness of the thick portion of the above-mentioned catalyst layer larger than and no more than 6 times, preferably 2–6 times that of the above-mentioned thin portion, it becomes easier to maintain the above-mentioned thickness of the thin portion within the optimum range, while also being able to suppress excessive thickness of the thick portion.

Embodiment 1

The following provides an explanation of a purification catalyst for exhaust gas of internal combustion engines in an embodiment of the present invention with reference to FIGS. 1 through 4.

In the present embodiment, a purification catalyst 1 for exhaust gas used in automobile catalytic converter 5 having hexagonal cells (samples E1 through E4) and that having square cells (sample C1) were fabricated as shown in FIG. 1, and their pressure loss characteristics were compared.

Figure 2:
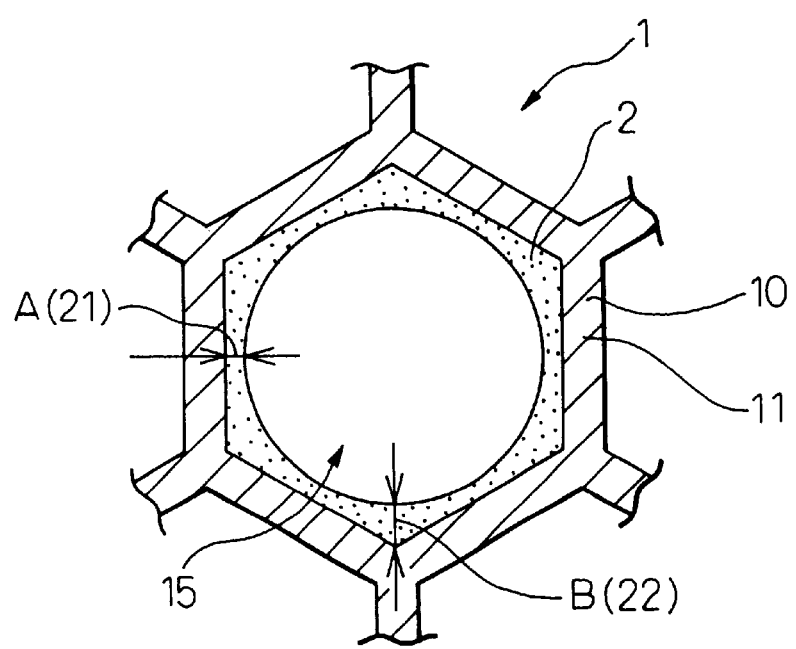
FIG. 2 is an explanatory drawing showing the loaded state of the catalyst layer of the purification catalyst for exhaust gas of the present invention in a first embodiment of the present invention.

To begin with, as shown in FIGS. 1 and 2, purification catalyst 1 for exhaust gas pertaining to samples E1 through E4 as articles of the present invention is composed of monolithic carrier 10, provided with hexagon-shaped cells 15 at 200 cells/in$^2$ or more and in which porosity of the partition walls 11 that form the above-mentioned cells 15 is 25% or more, and catalyst layer 2 arranged on the surface of the above-mentioned partition walls 11 of said monolithic carrier and containing the catalyst component for exhaust gas purification. As shown in FIG. 2, the thickness of said catalyst layer 2 is such that thickness A of thin portion 21 is 10–70 μm, and thickness B of thick portion 22 is no more than 12 times thickness A of thin portion 21. Furthermore, in FIG. 1, the actual hexagonal shape of the cells is not depicted for the sake of convenience in preparing the drawings.

The following provides a more detailed explanation.

As shown in FIGS. 1 and 2, monolithic carrier 10 of the present embodiment provides partition walls 11 having a thickness of 6 mil (approx. 150–170 μm) in the shape of a hexagonal lattice, and hexagon-shaped cells (hexagonal cells) 15 have 400 cells/in$^2$. In addition, this monolithic carrier 10 is composed of ceramic having cordierite has its main component, and the porosity of partition walls 11 is 35%.

In addition, monolithic carrier 10 is in the form of a cylindrical column having dimensions consisting of an outer diameter of 93 mm and length of 147 mm.

In addition, loading of catalyst onto monolithic carrier 10 was performed using a slurry prepared by adding alumina powder and water to catalyst components in the form of platinum and rhodium. Namely, the above-mentioned slurry was loaded onto partition walls 11 of monolithic carrier 10 followed by drying to provide the above-mentioned catalyst layer 2 on the surface of partition walls 11.

In the present embodiment, four types of purification catalysts for exhaust gas (samples E1 through E4) were fabricated in which thickness A of thin portion 21 of catalyst layer 2 was changed between 26.5–67.5 $\mu$m. More specifically, thickness A of thin portion 21 of catalyst layer 2 was 26.5 $\mu$m in sample E1, 41.5 $\mu$m in sample E2, 57.0 $\mu$m in sample E3 and 67.5 $\mu$m in sample E4.

In addition, thickness B of thick portion 22 of catalyst layer 2 was held within the range of no more than 6 times thickness A of thin portion 21 in all samples, being 120 $\mu$m in sample E1, 135 $\mu$m in sample E2, 150 $\mu$m in sample E3 and 160 $\mu$m in sample E4.

Figure 3:
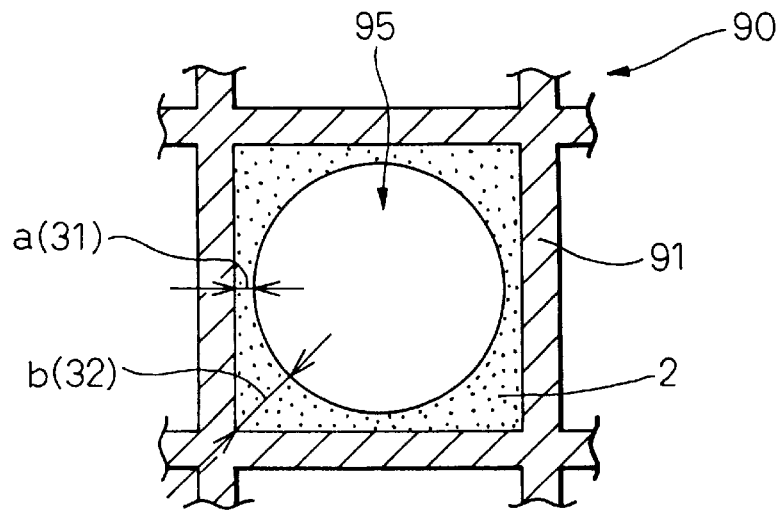
FIG. 3 is an explanatory drawing showing the loaded state of a catalyst layer of a purification catalyst for exhaust gas of a comparison product in a first embodiment of the present invention.

Next, as shown in FIG. 3, a purification catalyst for exhaust gas was fabricated in the form of sample C1 using monolithic carrier 90 having square-shaped cells (square cells) 95 as a comparative article in the present embodiment.

As shown in FIG. 3, monolithic carrier 90 of sample C1 is provided with partition walls 91 having a thickness of 6 mil (approx. 150–170 $\mu$m), and square cells 95 have 400 cells/in$^2$. In addition, this monolithic carrier 90 is composed of ceramic having cordierite for its main component, and the porosity of partition walls 11 is 35% in the same manner as samples E1 through E4.

In addition, the external shape of monolithic carrier 90 in sample C1 was made to be similar to monolithic carrier 10 of samples E1 through E4.

In addition, sample C1 was provided with catalyst layer 3 in which thickness a of thin portion 31 was 30 $\mu$m and thickness b of thick portion 32 was 260 $\mu$m by loading the catalyst using a slurry similar to that in the case of samples E1 through E4. Others are the same as samples E1 to E2.

Next, the pressure loss of each sample in this embodiment was measured.

Pressure loss was determined by measuring the difference between inlet pressure and outlet pressure of the exhaust gas when exhaust gas was passed through the catalytic converter at a flow rate of 1500 liters/minute.

Figure 4:
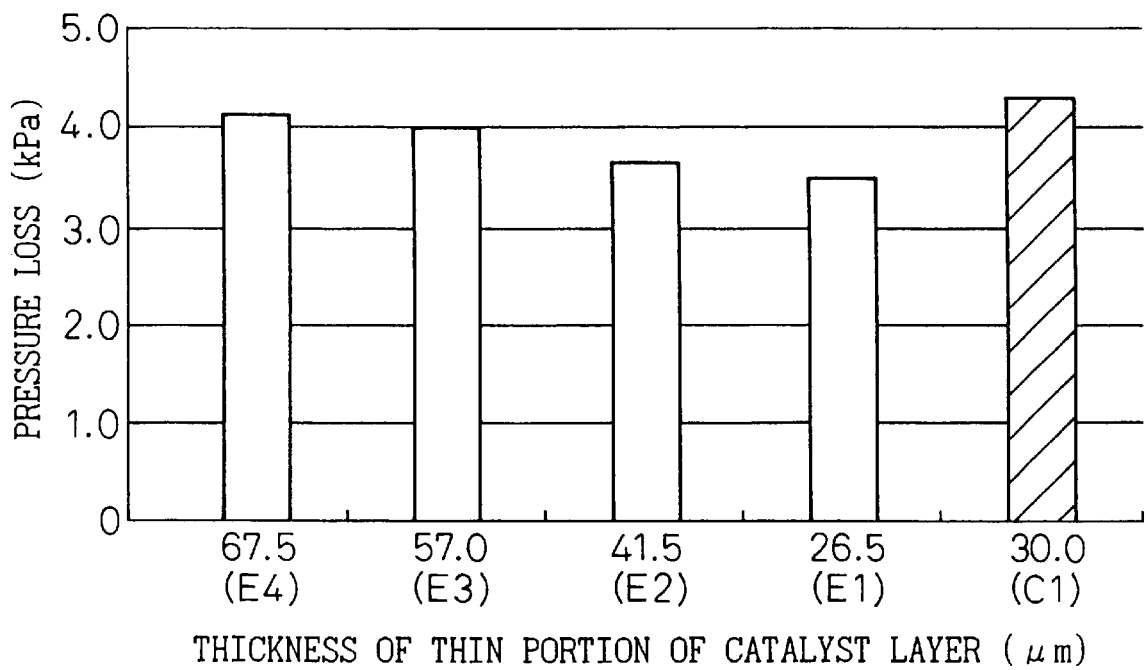
FIG. 4 is a graph showing the relationship between thickness of the thin portion of the catalyst layer and pressure loss in a first embodiment of the present invention.

Measurement results are shown in FIG. 4. In this graph, the thickness of the thin portion of the catalyst layer (sample no.) is plotted on the horizontal axis, while pressure loss (kPa) is plotted on the vertical axis.

As can be understood from this graph, although pressure loss increased with increasing thickness of the thin portion of the catalyst layer in samples E1 through E4 as articles of the present invention, the results were favorable in that this pressure loss was less than that of sample C1 in the form of a comparative article. Based on these results, the articles of the present invention having hexagonal cells can be seen to be able to improve pressure loss characteristics over articles of the prior art having square cells.

Embodiment 2

In this embodiment, HC 50% purification time was measured using samples E1 through E4 and sample C1 used in Embodiment 1 as shown in FIG. 5.

Measurement conditions were in accordance with the conditions stipulated in LA #4 of 75FTP of the United States of America. The time was measured from the time the engine used was, started until the HC concentration at the outlet of the catalytic converter reached 50% that of the inlet.

In addition, this measurement was respectively performed for case A in which each sample was fresh, and case B in which each sample had deteriorated to a degree equivalent to traveling 80,000 kilometers. In addition, the size of the monolithic carrier of each sample was changed to be in the shape of a cylindrical column having dimensions consisting of an outer diameter of 93 mm and length of 37 mm.

Measurement results are shown in FIG. 5. In this graph, the thickness of the thin portion of the catalyst layer (sample no.) is plotted on the horizontal axis, while the HC 50% purification time (sec) is plotted on the vertical axis, and measured values are shown for fresh state A and deteriorated state B.

As can be understood from the graph, the HC 50% purification times for samples E1 through E4 of the present invention were shorter than that of sample C1 as a comparative article for both fresh state A and deteriorated state B. Based on these results, the articles of the present invention can be understood to be advantageous also with respect to rapidly demonstrating purification performance.

Embodiment 3

In this embodiment, the cold mold bag value (THC value) was measured using samples E1 through E4 and sample C1 used in Embodiment 1 as shown in FIG. 6.

Measurement conditions were also in accordance with the conditions stipulated in LA #4 of 75FTP of the United States of America. Namely, the cold bag value (g/mile) of the LA #4 mode was measured, and the data was not multiplied by a weighting factor. Here, although there are weighting factors for three bag values (cold=0.43×3.6/7.5, hot 1=3.9/7.5, and hot 2=0.57×3.6/7.5), it was decided to omit multiplying data by these weighting factors in this embodiment. Furthermore, the size of the monolithic carrier of each sample was changed to the shape of a cylindrical column having an outer diameter of 93 mm and length of 147 mm.

Measurement results are shown in FIG. 6. In this graph, the thickness of the thin portion of the catalyst layer (sample no.) is plotted on the horizontal axis, while the above-mentioned THC value (g/mile) is plotted on the vertical axis.

As can be understood from this graph, samples E1 through E4 of the present invention demonstrated THC values that were equal to or better than that of sample C1 as a comparative article. These measured values of 0.10 or less can be said to be excellent THC values.

As has been indicated in each of the above-mentioned embodiments, the articles of the present invention having hexagonal cells (samples E1 through E4) demonstrated performance that was equal to, or better than, the comparative article having square cells (sample C1) for all measured parameters.

On the basis of these results, the use of a monolithic carrier provided with hexagonal cells at 200 cells/in$^2$ or more (e.g., 400 cells/in$^2$), making the porosity of its partition walls 25% or more (e.g., 35%), and making the thickness of the catalyst layer such that the thickness of the thin portion is 10–70 $\mu$m and the thickness of the thick portion is no more than 12 times that of the thin portion, makes it possible to demonstrate purification performance that is superior to that in the case of square cells of the prior art.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A purification catalyst for exhaust gas from internal combustion engines comprising: a monolithic carrier provided with hexagonal cells of 200 cells/in$^2$ or more in which the porosity of the partition walls that form said cells is 25% or more; and, a catalyst layer containing a catalyst component for purification of exhaust gas arranged on the surface of said partition walls of said monolithic carrier; wherein, the thickness of said catalyst layer at a thin portion on each cell wall of said hexagonal cells is 10–70 $\mu$m, and each cell's thick portion has a thickness of no more than 12 times that of said thin portion.

2. A purification catalyst for exhaust gas according to claim 1 wherein the porosity of said partition walls is 30% or more.

3. A purification catalyst for exhaust gas according to claim 1 wherein the thickness of said catalyst layer is such that the thickness of said thin portion is 20–50 $\mu$m, and the thickness of said thick portion is larger than and no more than 6 times the thickness of said thin portion.

4. A purification catalyst for exhaust gas according to claim 3 wherein the thickness of said thick portion is 2–6 times the thickness of said thin portion.

5. A purification catalyst for exhaust gas according to claim 2 wherein the thickness of said catalyst layer is such that the thickness of said thin portion is 20–50 $\mu$m, and the thickness of said thick portion is larger than and no more than 6 times the thickness of said thin portion.

6. A purification catalyst for exhaust gas according to claim 5 wherein the thickness of said thick portion is 2–6 times the thickness of said thin portion.

7. A purification catalyst for exhaust gas according to claim 1, wherein the thickness of said catalyst layer is such that the thickness of said thin portion is 20–70 $\mu$m.

8. A purification catalyst for exhaust gas according to claim 1, wherein the thickness of said catalyst layer is such that the thickness of said thin portion is from 20 to 50 $\mu$m.

9. A purification catalyst for exhaust gas according to claim 1, wherein the thickness of said thick portion is 2–6 times the thickness of said thin portion.

10. A purification catalyst for exhaust gas according to claim 1, wherein the thickness of said catalyst layer is 20–70 $\mu$m at its thin portion, and its thick portion has a thickness of no more than 6 times that of said thin portion.

* * * * *